(12) United States Patent
Odaohhara et al.

(10) Patent No.: US 7,928,696 B2
(45) Date of Patent: Apr. 19, 2011

(54) METHOD FOR ENSURING SAFE USE OF A BATTERY PACK AFTER IMPACT

(75) Inventors: Shigefumi Odaohhara, Yamato (JP); Mitsuru Ogawa, Yamato (JP); Takashi Sugawara, Machida (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 546 days.

(21) Appl. No.: 12/119,708

(22) Filed: May 13, 2008

(65) Prior Publication Data

US 2008/0297116 A1    Dec. 4, 2008

(30) Foreign Application Priority Data

May 29, 2007  (JP) ................................. 2007-141189

(51) Int. Cl.
*H02J 7/00* (2006.01)
(52) U.S. Cl. ........ 320/134; 320/112; 320/130; 320/132; 320/133; 320/136
(58) Field of Classification Search .................... 320/134
See application file for complete search history.

(56) References Cited

U.S. PATENT DOCUMENTS

| | | | |
|---|---|---|---|
| 6,011,380 A * | 1/2000 | Paryani et al. ................. | 320/132 |
| 2005/0225299 A1* | 10/2005 | Petrovic ......................... | 320/141 |
| 2006/0250262 A1* | 11/2006 | Song ........................ | 340/636.15 |

FOREIGN PATENT DOCUMENTS

| | | |
|---|---|---|
| JP | 11-040205 | 2/1999 |
| JP | 2001-102092 | 4/2001 |
| JP | 2004-172058 | 8/2004 |

* cited by examiner

*Primary Examiner* — Edward Tso
*Assistant Examiner* — Johali A Torres Ruiz
(74) *Attorney, Agent, or Firm* — Antony P. Ng; Dillon & Yudell LLP

(57) ABSTRACT

A battery pack is disclosed. The battery pack includes a battery, an impact sensor, a processor and a memory. The impact sensor is capable of generating an impact signal in response to a detection of an impact on the battery pack. The processor is capable of generating impact information based on the impact signal, and processor continues to count a number of charging times to the battery after the generation of the impact information. The memory is capable of storing the impact information and the number of charging times. The processor can refer to the memory to deliver a control command to a battery charger so that the battery can only be charged up to an allowable charge capacity smaller than a full charge capacity after an occurrence of an impact when the battery pack is attached to the battery charger. The charging to the battery stops when the number of the counted charging times reaches a predetermined number of allowable charging times that is allowed after the generation of the impact information.

11 Claims, 10 Drawing Sheets

METHOD FOR ENSURING SAFE USE OF A BATTERY PACK AFTER IMPACT

PRIORITY CLAIM

The present application claims benefit of priority under 35 U.S.C. §§120, 365 to the previously filed Japanese Patent Application No. JP2007-141189 entitled, "Battery pack, apparatus, and charging control method" with a priority date of May 29, 2007, which is incorporated by reference herein.

BACKGROUND OF THE INVENTION

1. Technical Field

The present invention relates to charging systems in general, and in particular to a method for ensuring safe use of a battery pack after an impact had occurred on the battery pack.

2. Description of Related Art

Most rechargeable batteries mounted on a notebook personal computer (PC) take a form of a battery pack that includes multiple battery cells composed of a lithium ion rechargeable battery having a high-energy density and in which the battery cells are combined by serial or parallel connection and are contained in a housing.

With reference now to the drawings, and in particular to FIGS. 10A and 10B, there are depicted are partial cross sectional views of a cylindrical cell 1000 of a lithium ion rechargeable battery. Specifically, FIG. 10A shows a normal state of the cell. A positive electrode 1003 is formed by applying lithium cobalt oxide on both surfaces of a metal foil. A negative electrode 1001 is formed by applying a carbon material on both surfaces of a metal foil. Connection terminals (not shown) are welded to the positive electrode 1003 and the negative electrode 1001. A separator 1005 is inserted between the positive electrode 1003 and the negative electrode 1001 and they are wound in a cylindrical shape and inserted into an outer container 1007. The positive electrode 1003 and the negative electrode 1001 are also connected to external terminals (not shown).

These elements are inserted into the outer container 1007 and an electrolytic solution 1009 is injected therein and hermetically sealed. The separator 1005 is a porous insulating film that allows movement of ions therethrough, and the electrolytic solution 1009 is an organic electrolytic solution in which a lithium salt is dissolved in an inflammable organic solvent. The outer container 1007 has installed therein a gas discharge value (not shown) that discharges gas generated from the decomposed electrolytic solution to prevent explosion.

Upon charging/discharging the lithium ion rechargeable battery, it is necessary to precisely control charging/discharging current and voltage. Therefore, in a battery pack using the lithium ion rechargeable battery, a microprocessor unit (MPU) is provided within the battery pack. In recent years, a battery pack generally employs a scheme called a smart battery in which an MPU monitors an internal state of the battery pack during charging and discharging to send information to a notebook PC or to activate a protection circuit. The smart battery is a battery device that is compliant with the standards called smart battery system (SBS) initiated by Duracell Inc. and Intel Inc. A battery pack compliant with the above standards is also called an intelligent battery.

In an intelligent battery, an electric circuit portion includes an MPU, a current measurement circuit, a voltage measurement circuit, a temperature sensor, and the like, and a rechargeable battery, all mounted on a substrate contained within a housing. The MPU is operable to communicate with an embedded controller of the notebook PC body via data lines. A protection circuit is also installed in the intelligent battery. When an abnormality occurs in the cell during operation, the protection circuit can be activated to stop any charging/discharging operations. In addition, the remaining capacity of the intelligent battery is monitored by the MPU; therefore, it is possible to change a power consumption mode of the notebook PC in accordance with the remaining capacity in cooperation with the notebook PC body. Moreover, when the remaining capacity becomes low or when an abnormality has occurred in the battery, an alarming message may be displayed on a display so that the operation of the notebook PC can be stopped.

The lithium ion rechargeable battery can be charged up to a rated capacity at the start of use; however, a chargeable capacity decreases with repeated charging and discharging operations. The chargeable capacity decreasing with the repeated charging and discharging operations is referred to as the full charge capacity at respective time instants. For example, the full charge capacity of the lithium ion rechargeable battery after 300 times of repeated charging and discharging becomes about 80 percents of the rated capacity.

The battery pack is usually carried while being mounted on the notebook PC rather than carried alone. The housing of the battery pack mounted on the notebook PC often constitutes a portion of a housing of the notebook PC body. In addition, a so-called extension battery pack is also employed in which a portion of the housing of a battery pack protrudes out from the housing of the notebook PC. When the notebook PC is dropped and a strong impact having the weight of the notebook PC added thereto is applied to the battery pack, there is a possibility of a short-circuiting occurring in the cell, causing an explosion or fire, which may spread into the entire cell.

As described above, an intelligent battery includes a current measurement circuit, a voltage measurement circuit, and a temperature sensor. When the cell is subjected to an impact whereby the positive electrode 1003 and the negative electrode 1001 are short-circuited to cause an electrical abnormality such as abnormally large current flow or a physical abnormality such as temperature rise in a specific cell, the intelligent battery can detect such abnormalities and activates a protection circuit. Such an internal protection circuit of the battery pack is only able to cope with a current increase or temperature rise that progresses relatively slowly with the abnormalities of the cell generated by the impact; however, it cannot perfectly protects the battery pack from an abrupt phenomenon such as an explosion or fire.

FIG. 10B shows a state where the cell 1000 is subjected to an impact from the direction of an arrow X and a depression (dent) 1011 is formed in a portion of the outer container 1007. Depending on the level or type of the impact applied to the outer container 1007, the depression 1011 formed in the outer container 1007 may be subtle. In such a case, the electrolytic solution 1009 or the inflammable gas may not be discharged outside, and moreover, no prominent change in the temperature or current may be detected by a sensor. However, when the cell 1000 is continuously charged and discharged in such a state, a damage 1013 as illustrated in FIG. 10B may occur inside the cell 1000, such as breakage of the positive electrode 1003, the negative electrode 1001, and the separator 1005; abnormally narrow gap or subtle short-circuiting between the positive electrode 1003 and the negative electrode 1001; or peeling of an active material (lithium cobalt acid of the positive electrode 1003 and carbon of the negative electrode 1001) on the electrode surface.

Moreover, whenever charging/discharging operations are repeated, a physical change may occur inside the cell 1000, such as repeated expansion/contraction of the positive electrode and the negative electrode or adhering of lithium metal on the negative electrode 1001. As a result, when the charging/discharging operations are repeatedly performed on the cell 1000 having been subjected to the impact, the damage 1013 may develop, leading into a completely short-circuited state and immediately generating heat, whereby the electrolytic solution 1009 or the inflammable gas may be discharged from the outer container 1007. Therefore, when the battery pack is subjected to an impact which is expected to cause the battery pack to fall into a dangerous state, it is desirable to stop the use and to replace with a new product even if no abnormal current increase or temperature rise is detected.

According to the prior art, an impact applied to the battery pack is detected using an impact sensor or the like, and the battery pack having been subjected to the impact is immediately prohibited from use. In conjunction, an alarm message is sent to a user to prompt replacement of the battery pack.

However, when a user having received such an alarm message is unable to immediately replace the battery pack, the portability of the notebook PC and the user's convenience may be impaired. Moreover, it is difficult to precisely set a use condition or period that guarantees a safe use after occurrence of the impact. A battery pack having been subjected to an impact greater than a predetermined magnitude is more likely to catch fire as the period of continued use increases; however, the danger level also depends on the magnitude or frequency of the impact. Although it is not necessary to immediately prohibit the use of a notebook PC, in view of the user's convenience or safety, it is appropriate to immediately prohibit the use of the battery pack in a state where it is undesirable to continue use for a long time, or to leave the battery pack without applying any restriction.

Consequently, it would be desirable to provide a method for ensuring safe use of a battery pack after an impact.

SUMMARY OF THE INVENTION

In accordance with a preferred embodiment of the present invention, a battery pack includes a battery, an impact sensor, a processor and a memory. The impact sensor is capable of generating an impact signal in response to a detection of an impact on the battery pack. The processor is capable of generating impact information based on the impact signal, and processor continues to count a number of charging times to the battery after the generation of the impact information. The memory is capable of storing the impact information and the number of charging times. The processor can refer to the memory to deliver a control command to a battery charger so that the battery can only be charged up to an allowable charge capacity smaller than a full charge capacity after an occurrence of an impact when the battery pack is attached to the battery charger. The charging to the battery stops when the number of the counted charging times reaches a predetermined number of allowable charging times that is allowed after the generation of the impact information.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1A:
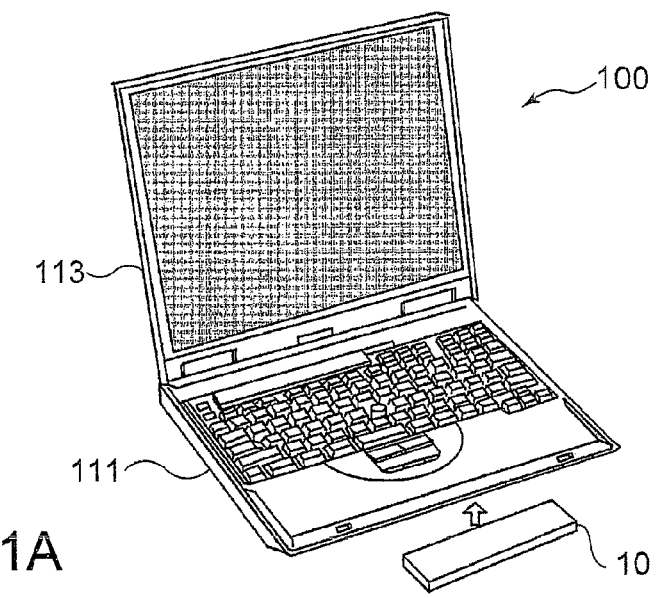
FIGS. 1A to 1C are diagrams illustrating an overall stricture of a notebook PC.
Figure 1B:
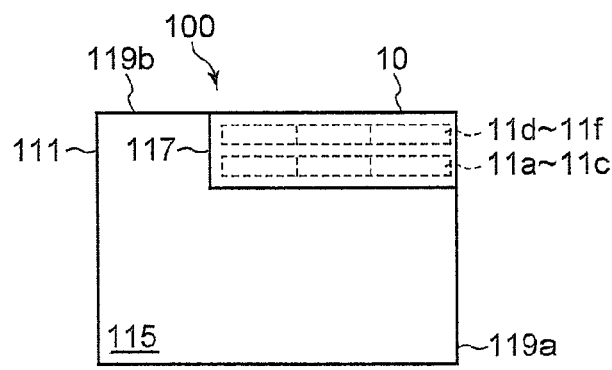
Figure 1C:
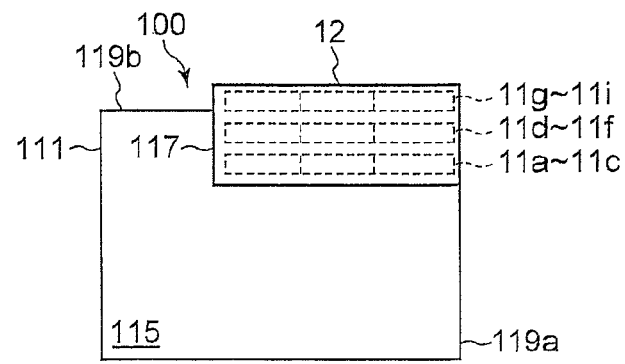

FIGS. 1A to 1C are diagrams illustrating an overall structure of a notebook personal computer (PC) 100, in accordance with a preferred embodiment of the present invention. Specifically, FIG. 1A is a perspective view of a state where a user opens to use the notebook PC 100; and FIG. 1B is a plan view illustrating a bottom 115 of a main housing 111 in a state where a battery pack 10 is attached to the notebook PC 100. The note PC 100 includes the main housing 111 that has mounted on a surface thereof a keyboard and a pointing device and that accommodates therein many devices, and a display side housing 113 that has mounted on a surface thereof a liquid crystal display (LCD). The display side housing 113 is openably and closably attached to the main housing 111. A battery bay 117 is formed at the rear of the bottom 115 of the main housing 111, and the battery pack 10 is removably attached to the battery bay 117.

The battery bay 117 is a cavity if the battery pack 10 is not attached thereto. In a state where the display side housing 113 is closed to shut the cover of the notebook PC 100, a substantially rectangular shape formed by a surface that is extended from the bottom 115 of the main housing 111 and the sides 119a and 119b of the main housing 111 so as to cover the cavity portion of the battery bay 117 and a remaining surface of the notebook PC 100 exposed to the outside forms an outline of a main body of the notebook PC 100. When the probability 10 is attached to the battery bay 117, a portion of a housing of the battery pack 10 that is substantially on the same surface as the bottom 115 and the sides 119a and 119b of the main housing 111 forms a portion of the outline of the notebook PC 100. The battery pack 10 accommodates therein six cells 11a to 11f, in which a set of cells 11a to 11c and a set of cells 11d to 11f are each serially connected to form cell arrays, and in which the cell arrays of the three serially connected cells are connected in parallel.

FIG. 1C is a plan view of the bottom of the notebook PC 100 in a state where an extension battery pack 12 is attached to the battery bay 117. The battery pack 12 can be attached to the battery bay 117 similar to the battery pack 10. When the battery pack 12 is attached to the battery bay 117, a portion of a surface of a housing thereof exist on a surface that contains the bottom 115 of the main housing 111; however, a portion of a cell accommodating portion protrudes outside the side 119b, which is the outline of the main body of the notebook PC 100. The battery pack 12 accommodates therein nine cells 11a to 11i, in which a set of cells 11a to 11c, a set of cells 11d to 11f, and a set of cells 11g to 11i are each serially connected to form cell arrays, and in which the cell arrays of the three serially connected cells are connected in parallel. An output voltage of the battery pack 12 is the same as that of the battery pack 10; however, the overall capacity is increased 1.5 times that of the battery pack 10. Instead, the three cells 11g to 11i accommodated in the protruding portion are easily subjected to an external impact. It is noted that the battery packs 10 and 12 can be considered as an identical electrical circuit except that they have different numbers of parallelly connected cells 11; therefore, they will be collectively described as the battery pack 10.

Figure 2:
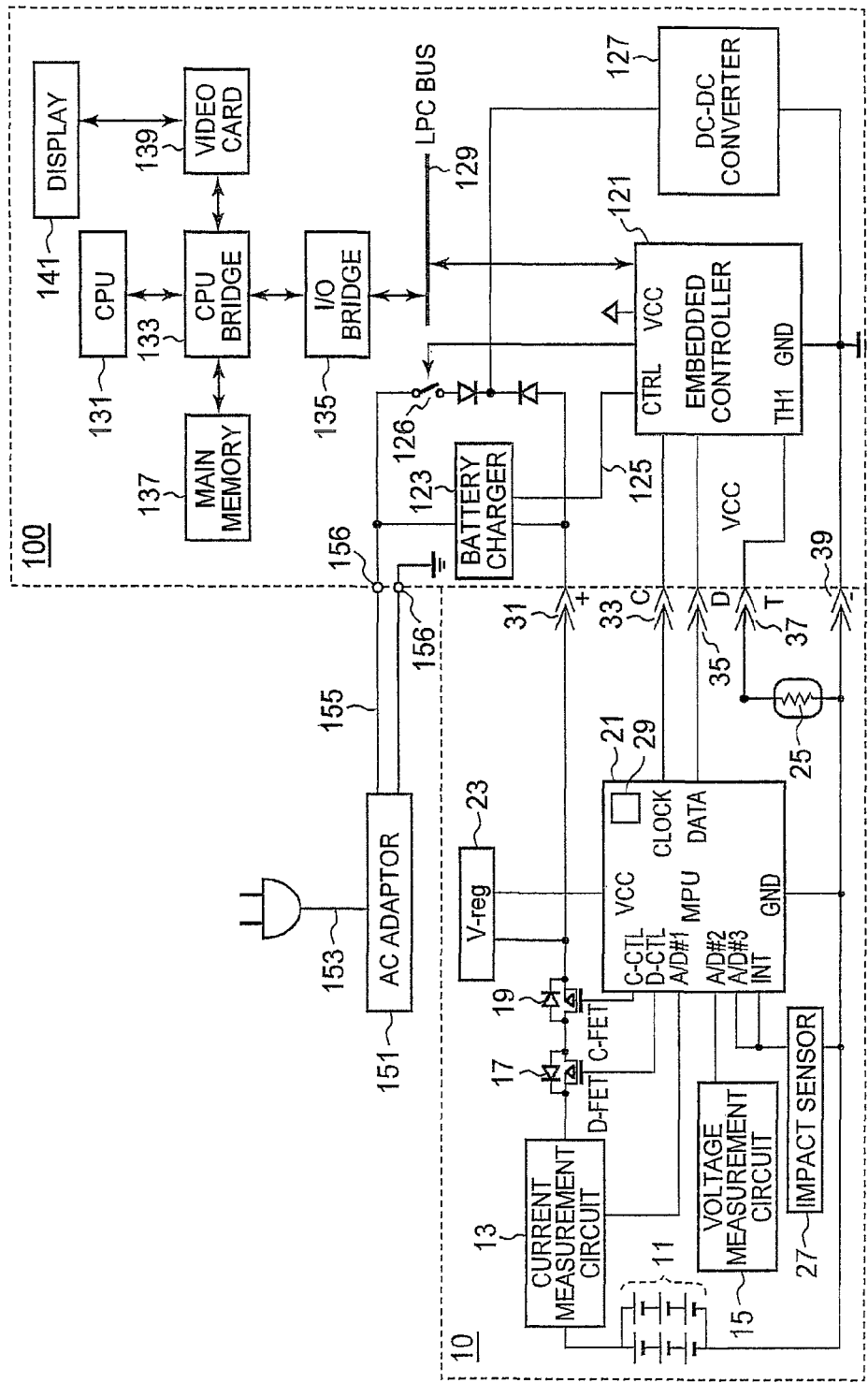
FIG. 2 is a block diagram of a battery pack and a notebook PC, in accordance with a preferred embodiment of the present invention.

FIG. 2 is a block diagram of the battery pack 10 in compliance with the SBS standards along with the notebook PC 100, in accordance with a preferred embodiment of the present invention. In addition to the multiple, serially and parallelly connected cells 11 of lithium ion rechargeable batteries, the battery pack 10 has installed therein many electronic components including a microprocessor unit (MPU) 21, a discharging field-effect transistor (FET) 17, a charging FET 19, a voltage regulator 23, a thermistor 25, an impact sensor 27, a current measurement circuit 13, and a voltage measurement circuit 15. The battery pack 10 is connected to the notebook PC 100 via five terminals of a positive (+) terminal 31, a C terminal 33, a D terminal 35, a T terminal 37, and a negative (−) terminal 39. A discharging current from the cells 11 and a charging current to the cells 11 flow between the cells 11 and the notebook PC 100 via the positive (+) terminal 31 and the negative (−) terminal 39. The C terminal 33 and the D terminal 35 are connected to a clock terminal and a data terminal of the MPU 21, respectively, and the T terminal 37 is connected to the thermistor 25, which is an element for measuring temperature around the cells 11.

The MPU 21 is operated by a constant voltage obtained via the voltage regulator 23, and is an integrated circuit in which in addition to a 8 to 16 bit central processing unit (CPU), a random access memory (RAM), a read-only memory (ROM), a flash memory 29, an analog input/output, a timer, and a digital input/output are integrated into one package and is capable of executing a program related to control of the battery pack 10. The MPU 21 monitors an input/output current of the cells 11 and voltages of the respective cells by the current measurement circuit 13 and the voltage measurement circuit 15. When an over-discharge is detected, the MPU 21 turns off the discharging FET 17, while the MPU 21 turns off the charging FET 19 when an overcharge is detected. Moreover, when an over-current is detected during discharging, both the discharging FET 17 and the charging FET 19 are turned off. The MPU 21 measures a charging current to the cells 11 and a discharging current from the cells 11 to thereby calculate the full charge capacity or a remaining capacity of the cells 11.

A clock line and a data line from the MPU 21 are connected to an embedded controller 121 at the notebook PC 100 side via the C terminal 33 and the D terminal 35, respectively, so that the MPU 21 can communicate with the embedded controller 121. The MPU 21 sends a control command such as a charging start command or a charging stop command to the embedded controller 121 via the data line. A battery charger 123 is not operated as long as the MPU 21 does not send the charging start command to the embedded controller 121, and therefore the cells 11 are not charged. In addition, even when the battery charger 123 is operated, as long as the MPU 21 does not turn on the charging FET 19, the cells 11 are not charged. The thermistor 25 changes its resistance in accordance with temperature around the cells 11 and a state thereof is detected by the embedded controller 121 via the T terminal 37.

The flash memory 29 is a RAM that can hold its stored contents even when a built-in power supply of the MPU 21 is cut off. A counter is set in the flash memory 29 for storing the number of charging times after the use of the battery pack 10 is started. The MPU 21 stores in the flash memory 29 the number of accumulated charging times from the start of use to the present time by incrementing the counter value by one whenever the battery pack is charged. The flash memory 29 stores therein information including: the nearest full charge capacity which is obtained through a capacity learning by a well-Known method; impact information representing that the battery pack 10 has been subjected to an impact; the number of allowable charging times which is an upper limit of the number of charging times that is allowed after having been subjected to a predetermined impact; allowed charge capacity that is allowed after having been subjected to a predetermined impact; a threshold value for generating the impact information from an impact signal; and charging prohibition information representing that charging to the cells 11 is prohibited.

The impact sensor 27 is an acceleration sensor that uses a piezoelectric device, and detects an external impact applied to the battery pack 10 as a change in acceleration by using a change in electric resistance due to the piezoresistive effect. When an electric power is supplied from the cells 11 and an impact is detected during attachment to the battery pack 10, the impact sensor 27 can output an analog impact signal. The output from the impact sensor 27 is connected to both an A/D input terminal (A/D #3) of the MPU 21 and an interrupt input terminal (INT) for generating interrupt to a built-in CPU of the MPU 21.

The MPU 21 is operable in a sleep mode, that is, a low power consumption mode, in addition to a normal mode. When an impact signal is input from the interrupt input terminal (INT), the sleep mode is immediately released and the MPU 21 transitions to the normal mode. Therefore, even when the impact sensor 27 is operated in the sleep mode, the MPU 21 can immediately transitions to the normal mode and read out the analog impact signal input from the A/D input terminal (A/D #3) to thereby generate a digital impact signal to be stored in the flash memory 29. The impact sensor 27 may be one capable of electrically measuring an impact force as a change in vibration instead of acceleration.

The MPU 21 converts the impact signal of various analog waveforms into a digital value. The MPU 21 selects only an impact signal which indicates that it is necessary to restrict a charging condition of the battery pack 10 based on a threshold value stored in the flash memory 29 to thereby generate digital impact information to be delivered to the embedded controller 121. The digital impact information may be a bit value indicating that it is necessary to restrict the charging condition of the battery pack 10. The impact information may be generated based on a value that represents the magnitude of an impact, such as a peak value of the analog waveform, a time to reach the peak value, or a duration time of an impact. In addition, the impact information may be generated including a frequency of occurrence of the impact signal. For example, the impact information may be generated when the peak value of the impact signal exceeds a predetermined threshold value only once, while the impact information may be generated when the peak value of the impact signal exceeds a threshold value lower than the predetermined threshold value a predetermined number of times.

A power management function of the notebook PC 100 mainly includes the embedded controller 121 and also includes the battery charger 123, a control line 125, and a DC-DC converter 127. The embedded controller 121 is an integrated circuit that controls many hardware elements of the notebook PC 100 as well as the power supply. The embedded controller 121 obtains information on a present current value and a present voltage value of the cells 11 through communication from the MPU 21 and controls the battery charger 123 via the control line 125 based on the obtained information to thereby control the charging of the battery pack 10.

Since the cells 11 are lithium ion rechargeable batteries, the battery charger 123 employs a constant-current/constant-voltage (CVCC) control method. To charge batteries under the CVCC control method, the battery charger 123 has set by the embedded controller 121 a constant-current control current value, which is a reference value during a constant current period, and a constant-voltage control voltage value, which is a reference value during a constant voltage period.

The AC adaptor 151 has a primary side connected to a commercial power supply by an AC cord 153 to convert an AC voltage to a predetermined DC voltage and a secondary side connected to an external power supply terminal 156 of the notebook PC 100 by a DC cable 155. The electric power supplied from the AC adaptor 151 or the battery pack 10 is supplied to a system load within the notebook PC 100 via the DC-DC converter 127. The AC adaptor 151 supplies a charging current to the battery pack 10 via the battery charger 123. A peak shift switch 126 is connected to a DC power supply line extending from the AC adaptor 151 to the DC-DC converter 127.

The peak shift switch 126 is a switch that can be switched on or off by the embedded controller 121. When the embedded controller 121 switches off the peak shift switch 126, an electric power is not supplied from the AC adaptor 151 to the DC-DC converter 127 while an electric power is only supplied from the battery pack 10. When the peak shift switch 126 is switched on, an electric power is supplied from the AC adaptor 151 to the DC-DC converter 127, and moreover, an electric power is supplied to the battery pack 10 via the battery charger 123 when there is a charging request.

The embedded controller 121 is also connected to an LPC bus 129, from which the embedded controller 121 can be connected to and communicate with the CPU 131, the main memory 137, a video card 139, the display 141, and other hardware elements of the notebook PC 100 via an I/O bridge 135, a CPU bridge 133, and the like. The CPU 131 receives a report on a power state from the embedded controller 121 and renders a calculation result based on the report using the video card 139 to thereby display the rendering result on the display 141.

It is to be understood that FIGS. 1 and 2 only illustrate the primary hardware constructions related to the present embodiment and the connections in order to describe the present embodiment. In addition to the components described above, many other electric circuits and devices such as a magnetic disk, an optical disk, or a keyboard are employed for the constitution of the battery pack 10 and the notebook PC 100. However, since these are well known to one having ordinary skill in the art, detailed explanations for them will not be provided here.

Figure 3B:
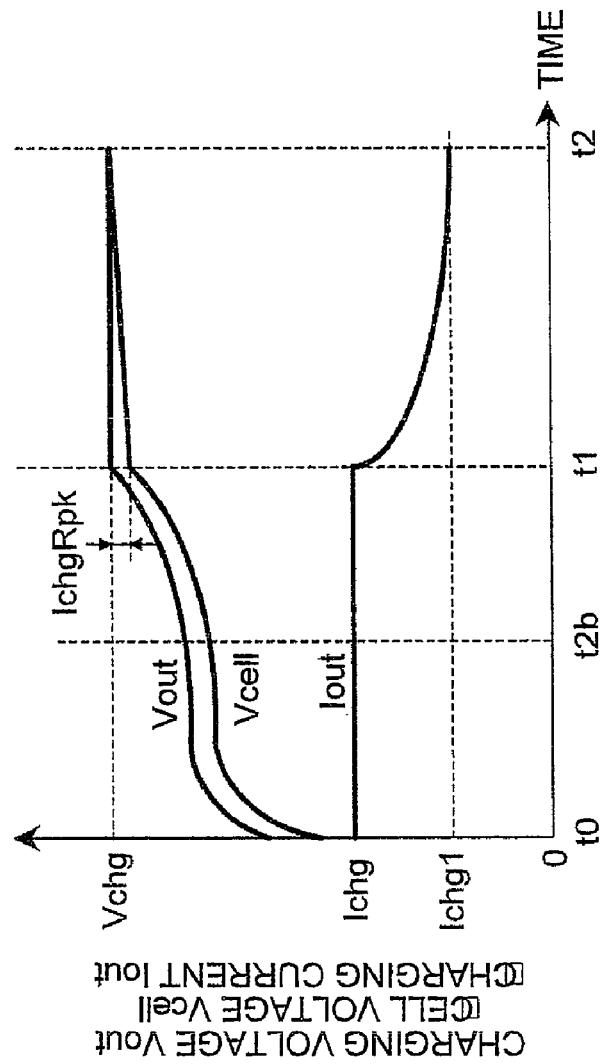
FIGS. 3A and 3B are diagrams for explaining a charging current and a charging voltage when a battery pack is charged.
Figure 3A:
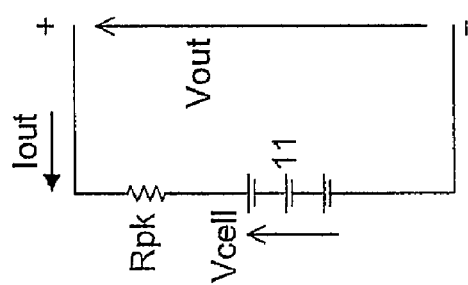

FIGS. 3A and 3B are diagrams for explaining a charging current and a charging voltage when the battery pack 10 is charged. Specifically, FIG. 3A is an equivalent circuit of the cells 11; and FIG. 3B is a diagram for explaining change with time of a charging voltage Vout and a charging current Iout output from the battery charger 123 after charging is started. The battery charger 123 charges the cells 11 via the CVCC control method in which Vchg is a constant-voltage control voltage value, Ichg is a constant-current control current value, Vcell is a value obtained by multiplying a cell voltage per one cell by 3, which is the number of serially connected cells, and Rpk is a value obtained by multiplying an internal resistance per one cell similarly by 3. The charging voltage Vout and the cell voltage Vcell are measured by the constant voltage measurement circuit 15 and the charging current Iout is measured by the current measurement circuit, and these measurement values are periodically delivered to the embedded controller 121 from the MPU 21.

When a charging is started at time t0 in a state where the cells 11 are completely discharged, the battery charger 123 is operated such that the charging current Iout is constant since the period between time t0 and time t1 is a constant current period. The charging voltage Vout and the cell voltage Vcell gradually increase, and the charging voltage Vout becomes equal to the constant-voltage control voltage value Vchg at time t1, whereby a relation of $Vchg=Ichg \times Rpk+Vcell$ is satisfied. Since the period subsequent to time t1 is the constant voltage period, the battery charger 123 controls the charging voltage Vout so as not to exceed the constant-voltage control voltage value Vchg.

During the constant voltage period, the charging voltage Vout is equal to the set constant-voltage control voltage value Vchg while the cell voltage Vcell gradually approaches the constant-voltage control voltage value Vchg and the charging current Iout gradually decreases as the charging proceeds. At time t2 at which the charging current Iout reaches a discharge termination current Ichg1, the operation of the battery charger 123 is stopped by the control of the embedded controller 121 and the charging is terminated. At a time the charging is terminated, the cell voltage Vcell becomes substantially equal to the charging voltage Vout. The amount of electricity charged during a period between time t0 and time t2 becomes the full charge capacity of the cells 11. Typically, in the constant current period, an amount of electricity corresponding to about 75 percents of the full charge capacity is charged to the cells. The MPU 21 monitors the values of the cell voltage Vcell and the charging current Iout by the voltage measurement circuit 15 and the current measurement circuit 13 during the charging period. At a time the discharge termination current Ichg1 is detected, a control command for stopping the charging is sent to the embedded controller 121 to thereby turn off the charging FET 19.

Once the battery charger 123 has started the charging operation after having received a charging start command from the embedded controller 121, the battery charger performs CVCC control by controlling the constant-voltage control voltage value Vchg and the constant-current control current value Ichg. If the battery charger 123 stops the charging operation at time t2b earlier than time t1, the amount of charged electricity during this period becomes smaller than the full charge capacity. An allowable charge capacity described later is the amount of electricity charged to the cells 11 during a period between time t0 and time t2b when the charging stops at time t2b.

Figure 4:
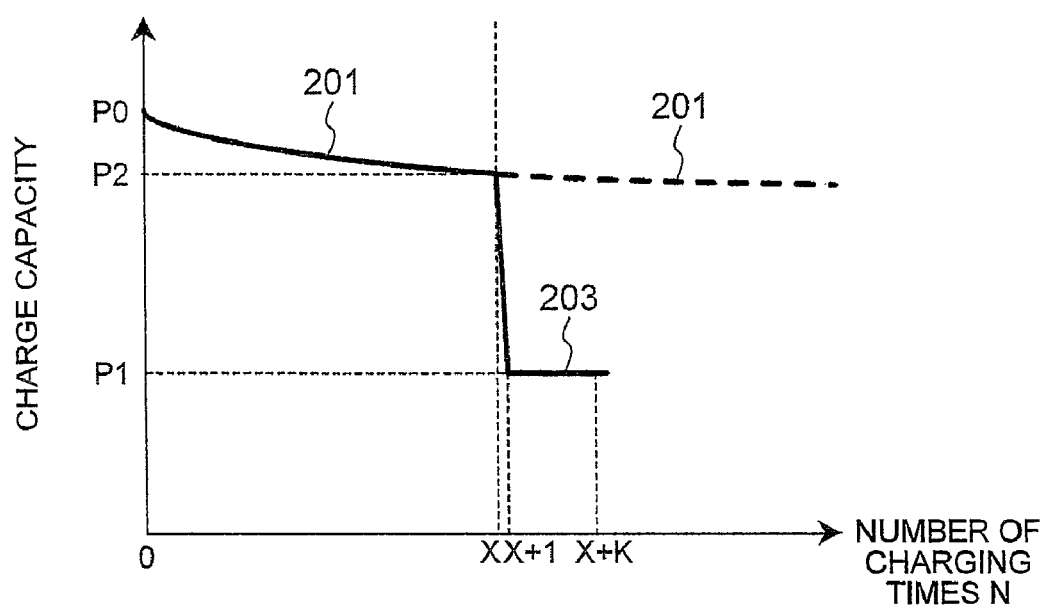
FIG. 4 is a diagram for explaining a method for restricting a use condition of a battery pack after an impact to ensure safe use.

FIG. 4 is a diagram for explaining a method for restricting a use condition of the battery pack 10 after the battery pack 10 had been subjected to an impact in order to ensure safe use of the battery pack 10. As shown, the number of charging times N is the number of charging times of the cells 11, wherein for N between 0 to X, N is an accumulated value from the start of use; and at N=X, the accumulated value is reset to 0 and thereafter N is accumulated again. As the number of charging times N increases, the cells 11 are gradually deteriorated and the internal resistance Rpk increases. As described in FIG. 3, as the internal resistance Rpk increases, the charging voltage Vout may reach the constant-voltage control voltage value Vchg at a time earlier than time t1. Moreover, the cell voltage Vcell at that instant may be lower than that of the less deteriorated cells. Therefore, as the internal resistance Rpk increases, the constant current period may be terminated in a short time, whereby the amount of electricity charged to the cells 11 during the decreased constant current period may also decrease.

As a result, the full charge capacity of the cells 11 decreases along the line 201 as the number of charging times increases. If an external impact is not applied to the battery pack 10, the cells 11 may be charged up to the full charge capacity as specified by the line 201 at each charging time. Now, it is assumed that an external impact is applied to the battery pack 10 at a time the number of charging times N became X. It is also assumed that the cells 11 have no great damage such as the electrolytic solution or inflammable gas emission, and no abnormality has been detected by the current measurement circuit 13, the voltage measurement circuit 15, and the thermistor 25. In such a case, a conventional battery pack may prohibit the charging operation at that instant, or repeat the charging up to the full charge capacity, whereby the full charge capacity may vary along the dotted portion of the line 201.

Figure 10A:
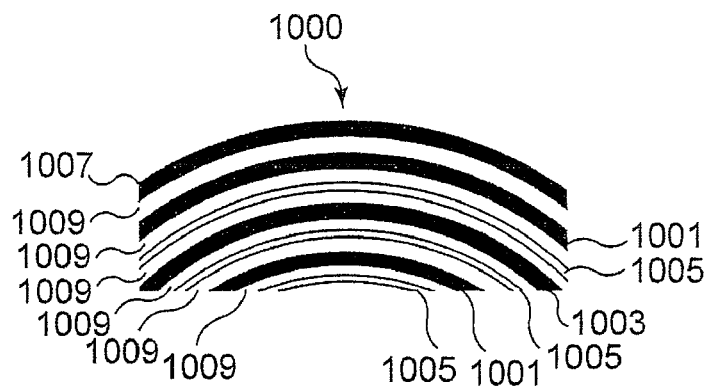
FIGS. 10A and 10B are partial cross-sectional views of a cylindrical cell of a lithium ion rechargeable battery.
Figure 10B:
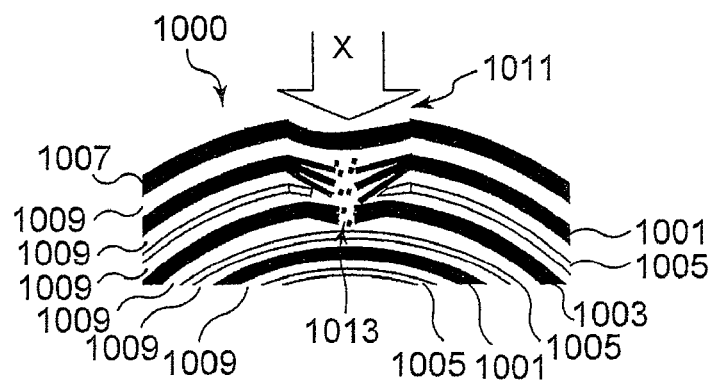

However, a damage 1013, as shown in FIG. 10B, may have occurred inside the cells 11, and when the damaged battery pack 10 is used continuously, the damage 1013 may develop and result in a short-circuiting. Therefore, when the cells 11 are repeatedly charged up to the full charge capacity along the dotted portion of the line 201 even after the battery pack 10 have been subjected to an impact, the amount of energy stored in the cells upon occurrence of the internal short-circuiting becomes so large that can increase the danger of fire or explosion.

The MPU 21 writes the impact information in the flash memory 29 and thereafter restricts the charging condition of the cells 11 after having been subjected to the impact. The restriction of the charging condition as used herein means restricting the charge capacity and the number of charging times. In the present invention, when an impact is applied to the battery pack 10 at a time the number of charging times accumulated from the start of use reaches X, the charge capacity for the number of charging times N of X+1 and greater is restricted to an allowable charge capacity P1 smaller than the full charge capacity P2 at that instant. The allowable charge capacity P1 is preferably set in the range of 30 percent to 50 percent of a rated capacity P0.

When the allowable charge capacity P1 becomes larger than 50 percents of the rated capacity, the danger upon occurrence of a short-circuiting increases. In accordance with a short-circuit test or an impact test which is conducted in order to validate a cell safety design, it is considered that when the charging capacity is set to about 50 percents of the rated capacity, it is less likely for the cells 11 to enter dangerous state even upon occurrence of an internal short-circuit. However, when the charging capacity decreases more than it needs, the portable use time is limited until the battery pack is replaced, thereby impairing user's convenience; therefore, it is preferable to leave at least 30 percent of the rated capacity. In the present invention, the allowable charge capacity P1 is set to a predetermined proportion of the rated capacity P0; however, the allowable charge capacity P1 may be set to a predetermined proportion of the full charge capacity P2 at a time the impact information is generated.

In addition, in the present embodiment, the number of allowable charging times K that is allowed after predetermined impact information has been generated is preset to the battery pack 10, and when the number of charging times after the impact information has been generated reaches the number of allowable charging times K, subsequent charging to the cells 11 is prohibited to thereby make the battery pack 10 unusable. Since it is considered that the damage to the cells 11 by the impact develops with the number of the charging times after occurrence of the impact, when the number of allowable charging times K is set, for example, to about 10 times to about 20 times, it may be possible to harmonize the user's convenience with the safety. The allowable charge capacity P1, the number of allowable charging times K, and the number of charging times after occurrence of an impact may be stored in advance in the flash memory 29 or the notebook PC 100. By storing such values in the flash memory 29, even when a notebook PC to which the battery pack 10 is attached is replaced, the history of the battery pack 10 can be desirably and correctly forwarded to a newly attached notebook PC.

Figure 5:
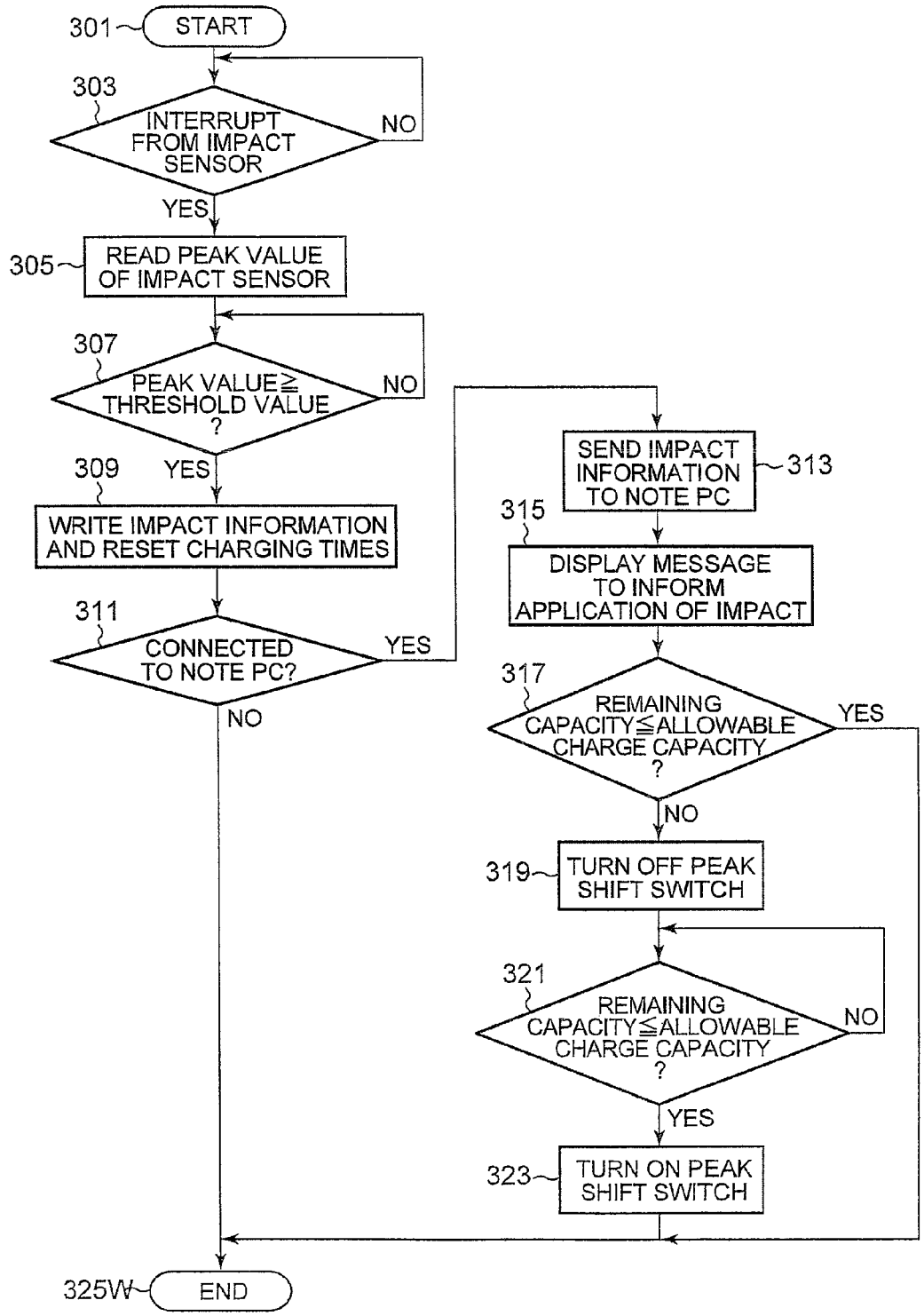
FIG. 5 is a flow chart illustrating an example of processes performed by the battery pack and the notebook PC when the battery pack is applied with an external impact.

FIG. 5 is a high-level logic flow diagram illustrating an example of processes performed by the battery pack 10 and the notebook PC 100 in order to restrict the charging capacity when the battery pack 10 is applied with an external impact. An operation program for executing the present invention is stored in a built-in ROM of the MPU 21 and read into a RAM, as shown in block 301. The battery pack 10 may be applied with an impact in a state where it is attached to the notebook PC 100 or in a separated state where it is removed from the notebook PC 100. In block 301, the MPU 21 is operated in a sleep mode. The AC adaptor 151 is connected to the external power supply terminal 156, and the peak shift switch 126 of the notebook PC 100 is turned on.

In block 303, the impact sensor 27 detects an impact to thereby generate an analog impact signal, and the analog impact signal is output to both the A/D input terminal (A/D #3) and the interrupt input terminal (INT) of the MPU 21. When the impact signal is output to the interrupt input terminal, the MPU 21 is immediately released from the sleep mode and transitions to a normal mode. In block 305, the MPU 21 converts the impact signal output from the impact sensor 27 to the A/D input terminal (A/D #3) into a digital value to thereby read out the peak value. In block 307, the peak value is compared with a predetermined threshold value stored in the flash memory 29. In this case, since the MPU 21 transitions to the normal mode immediately after an initial portion of the waveform of the impact signal has been detected, it is possible to read out the peak value of the waveform of the impact signal in the normal mode.

When the peak value of the impact signal is equal to or greater than the threshold value, a bit value as the impact information is stored in the flash memory 29 in block 309, and the number of charging times up to that instant stored in the counter of the flash memory 29 is reset. When the peak value of the impact signal is smaller than the threshold value, the MPU 21 returns to the sleep mode without performing any special operations and waits for output of the impact signal from the impact sensor 27 in the same state as before occurrence of the impact.

In block 311, the MPU 21 determines whether or not the battery pack 10 is connected to the notebook PC 100. If the battery pack 10 is connected to the notebook PC 100, the impact information is sent to the embedded controller 121 of the notebook PC 100 in block 313. If the battery pack 10 is not connected to the notebook PC 100, the process is completed at block 325. In block 315, the notebook PC 100 having received the impact information displays a message on the display 141, informing that since the battery pack 10 has been subjected to an impact, the charge capacity and the number of charging times are to be restricted, and prompting users to replace the battery pack 10. The displayed message may be as follows: This battery pack has been subjected to a strong impact from the outside. Therefore, this battery pack can be charged only 10 times to a capacity of 40 percents of a normal capacity. More than 10 times of charging is not allowed. Please immediately replace with or purchase a new battery pack.

The message displaying process is performed, for example, by a device driver and a power management utility in charge of controlling the power supply unit operated by the CPU 131 under the control of an operating system (OS) of the notebook PC 100. In block 317, the MPU 21 calculates a remaining capacity by subtracting the amount of electricity discharged after a full charge from the full charge capacity P2 at that instant stored in the flash memory 29. It is determined whether or not the remaining capacity (the charge capacity at that instant) is equal to or smaller than the allowable charge capacity P1. When the remaining cell capacity is equal to or smaller than the allowable charge capacity P1, the MPU 21 determines that the battery pack is at a safe use condition, and the process is completed at block 325. When the remaining capacity exceeds the allowable charge capacity P1, the MPU 21 sends a command to turn off the peak shift switch 126 to the embedded controller 121 and the embedded controller 121 turns off the peak shift switch 126 in block 319.

As a result, even when the AC adaptor 151 is connected to the external power supply terminal 156, since electricity is supplied from the cells 11 to the system load via the DC-DC converter 127, the remaining capacity of the cells 11 decreases in a short time. When the peak shift switch 126 is not provided, electricity is supplied from the AC adaptor 151 to the DC-DC converter 127 as long as the AC adaptor 151 is connected to the external power supply terminal 156; therefore, the remaining capacity of the cell 11 decreases only by self-discharge, whereby a state where the remaining capacity exceeds the allowable charge capacity P1 continues a long time, which is dangerous. However, by the operation of the peak shift switch 126, such a dangerous state is resolved in a short time.

In block 321, the MPU 21 determines whether or not the remaining capacity of the cells 11 is equal to or smaller than the allowable charge capacity P1. When the remaining capacity is equal to or smaller than the allowable charge capacity P1, a command for turning on the peak shift switch 126 is sent to the embedded controller 121 and the embedded controller 121 turns on the peak shift switch 126 in block 323, where the process is completed. Subsequently, the MPU 21 sends a control command such as a charging request command or a charging stop command to the embedded controller 121 so that the charge capacity of the cells 11 becomes equal to or smaller than the allowable charge capacity P1.

Figure 6:
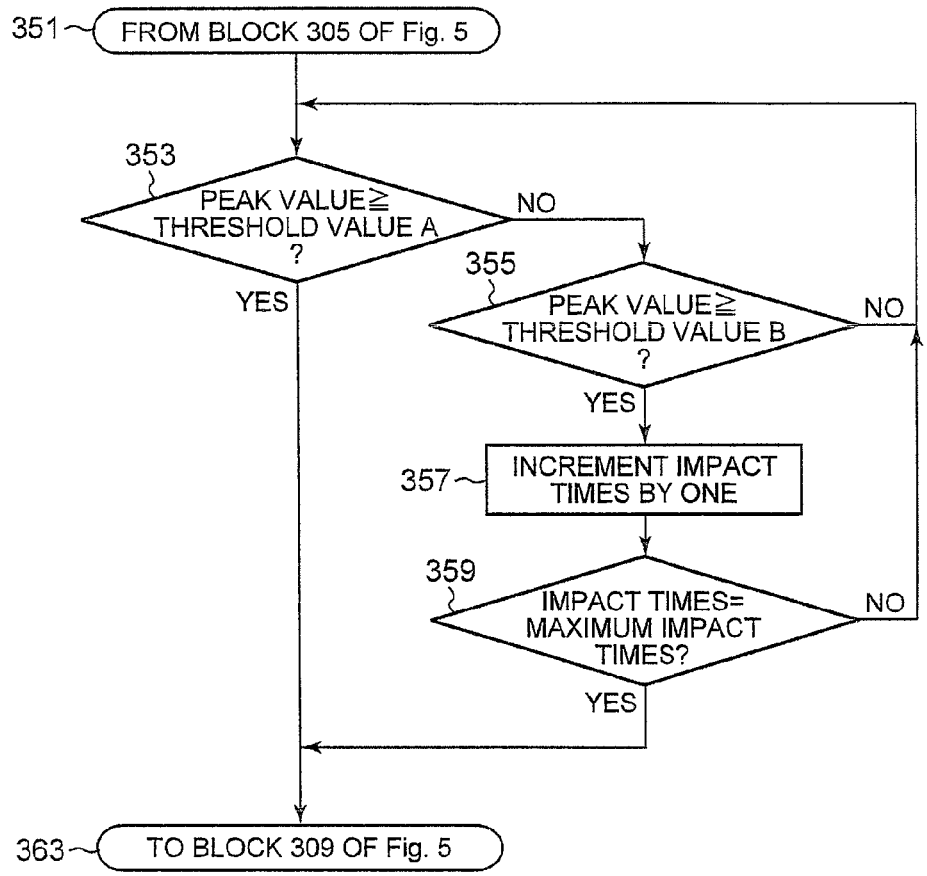
FIG. 6 is a flow chart in which a portion of the procedures of FIG. 5 is modified.

FIG. 6 is a high-level logic flow diagram in which a portion of the procedures of FIG. 5 is modified. The operations of blocks 301 to 305 of FIG. 5 are performed in substantially the same procedures of FIG. 5 (block 351). The only difference from blocks 301 to 305 is that a counter is set in the flash memory 29, and therefore, whenever the MPU 21 detects an impact signal of a predetermined peak value, the number of impact times stored in the counter is incremented by one. The initial value of the counter is set to zero (0). In block 353, the MPU 21 compares the peak value of the read impact signal with a threshold value A. When it is determined in block 353 that the peak value is equal to or greater than the peak value A, the flow proceeds to block 363, where the same processes as block 309 to 325 of FIG. 5 are performed.

When it is determined in block 353 that the peak value is smaller than the peak value A, the flow proceeds to block 355, where the peak value is compared with a threshold value B. Here, the threshold value B is set smaller than the threshold value A. The threshold value A is set to such a value that when the peak value of the impact signal exceeds the value at least once, it can be assumed that a great damage may occur in the cells. The threshold value B is set to such a value that when the peak value of the impact signal exceeds the value a predetermined number of impact times (the maximum number of impact times), it can be assumed that a damage may occur in the cells. When it is determined in block 355 that the peak value is smaller than the threshold value B, the flow returns to block 353 to wait for a next impact signal. When it is determined in block 355 that the peak value is equal to or greater than the threshold value B, the MPU 21 increments the counter of the flash memory 29 by one in block 357. In block 359, the MPU 21 determines whether or not the number of impact times stored in the counter reaches the maximum number of impact times. When it is determined that the number of impact times stored in the counter has not reached the maximum number of impact times, the flow returns to block 353 to wait for a next impact signal. When it is determined that the number of impact times stored in the counter has reached the maximum number of impact times, the flow proceeds to block 363.

Figure 7:
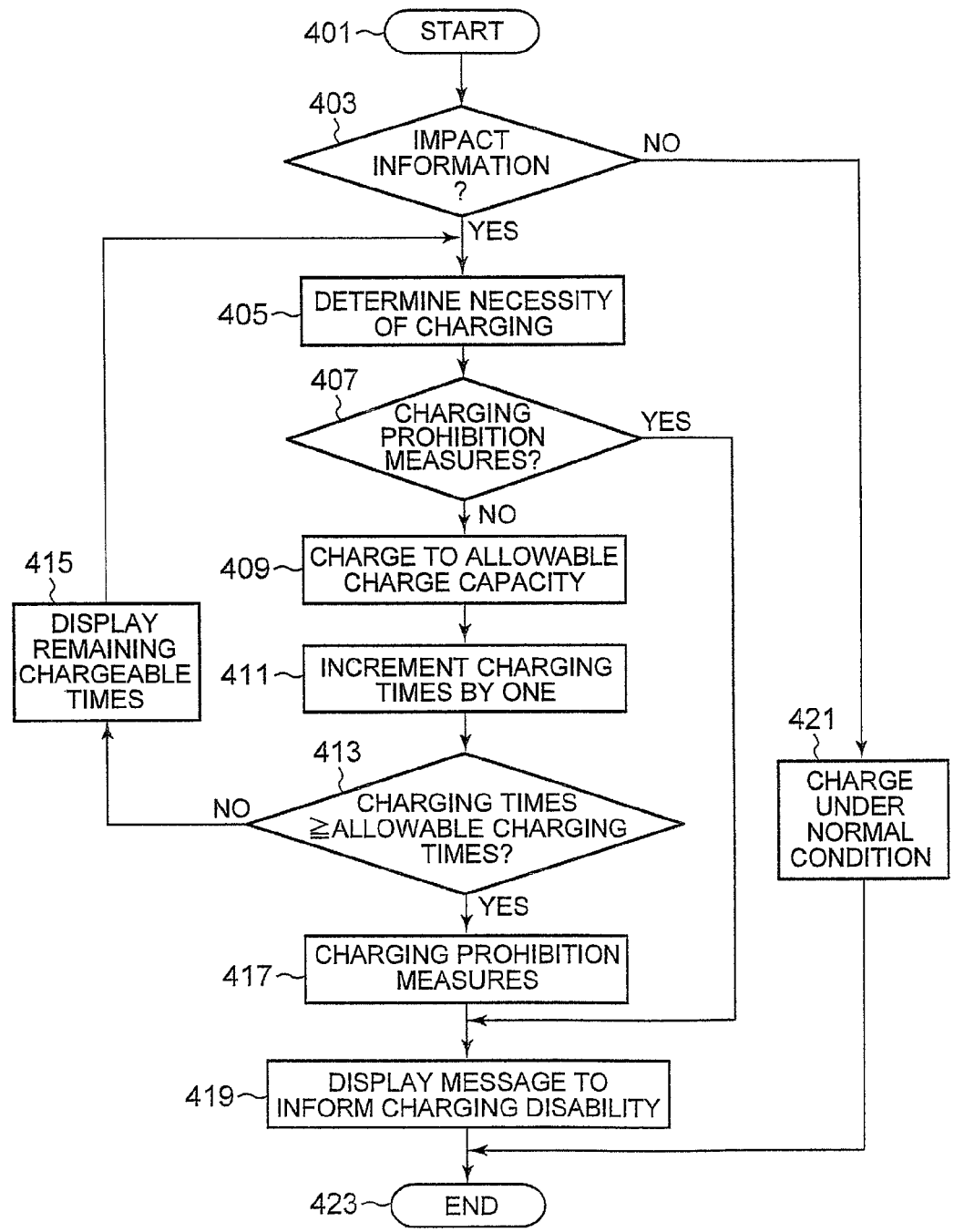
FIG. 7 is a flow chart illustrating an example of processes performed by the battery pack and the notebook PC subsequent to the processes of FIG. 5.

FIG. 7 is a high-level logic flow diagram illustrating an example of processes performed by the battery pack 10 and the notebook PC 100 subsequent to the process of block 325 of FIG. 5. In block 401, the MPU 21 of the battery pack 10 monitors the remaining capacity of the cells 11. When the MPU 21 determines in block 403 that impact information is not stored in the flash memory 29, the flow proceeds to block 421, where the MPU 21 sends a control command such as a charging start command or a charging stop command to the embedded controller 121 according to the needs to thereby perform charging and discharging of the cells 11 under a normal charging condition.

When the MPU 21 determines in block 403 that the impact information is not stored in the flash memory 29, the counter of the flash memory 29, which represents the number of accumulated charging times from the start of use, is reset. Subsequently, the flow proceeds to block 405, where the MPU 21 determines whether or not it is necessary to charge the cells 11 based on the remaining capacity of the cells 11. Here, the MPU 21 may determine that it is necessary to charge the cells 11 when the remaining capacity of the cells 11 is lowered up to 90 percents of the allowable charge capacity P1.

When the MPU 21 determines in block 407 that it is necessary to charge, the MPU 21 refers to the flash memory 29 to thereby determined whether or not charging prohibition information is stored in the flash memory 29. The charging prohibition information is stored in block 417 by the MPU 21 when the procedures of FIG. 7 are repeated. If the charging prohibition information is stored, the flow proceeds to block 419, where the MPU 21 sends to the embedded controller 121 a control command for displaying a message on the display 141, informing that the charging is prohibited. If the charging prohibition information is stored in the flash memory 29, even when the MPU 21 determines that the remaining capacity of the cells 11 is lowered and thus it is necessary to charge the cells 11, a control command for starting the charging is not sent to the embedded controller 121. In addition to, or as an alternative to, taking measures such as not sending the control command of the charging start command to the embedded controller 121, the MPU 21 may take measures to turn off the charging FET and to prohibit subsequent turning on.

If the charging prohibition information is not stored in the flash memory 29, the MPU 21 sends a control command of a charging start command to the embedded controller 121 and the embedded controller 121 activates the battery charger 123 to start a charging operation. When the charge capacity of the cells 11 reaches the allowable charge capacity P1 shown in FIG. 4, the MPU 21 sends a control command of a charging stop command to the embedded controller 121 and the embedded controller 121 stops the operation of the battery charger 123.

In block 411, the MPU 21 increments the number of charging times stored in the counter of the flash memory 29 by one. In block 413, the MPU 21 compares the number of charging times stored in the flash memory 29 with the allowable charging times K. When the number of charging times is smaller than the allowable charging times K, the flow proceeds to block 415, where the MPU 21 sends to the embedded controller 121 a control command for displaying the difference as the number of remaining chargeable times on the display 141, and thereafter, the flow returns to block 405. The number of charging times as used herein represents the number of charging times after the impact information has been generated. When the number of charging times is equal to or greater than the number of allowable charging times K, the flow proceeds to block 417, where the MPU 21 stores the charging prohibition information in the flash memory 29, and thereafter, the flow proceeds to block 419.

Figure 8:
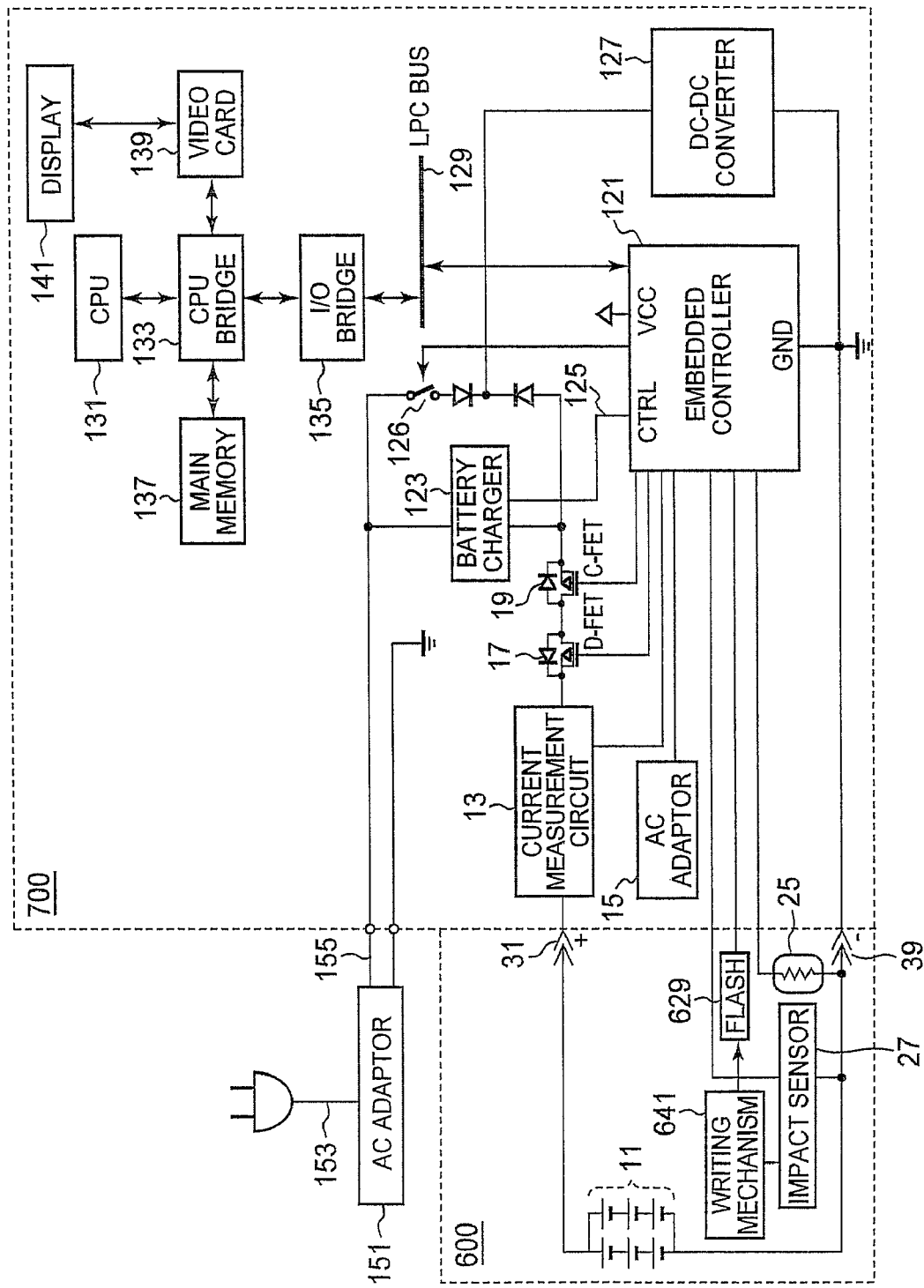
FIG. 8 is a block diagram of a battery pack and a notebook PC, in accordance with a second embodiment of the present invention.

FIG. 8 is a block diagram of a battery pack 600 and a notebook PC 700, in accordance with a second embodiment of the present invention. In FIG. 8, the same components as FIG. 2 will be referenced by the same reference numerals, and thus redundant description thereof will be omitted. Accordingly, only the difference will be described here. The battery pack 600 is a non-intelligent battery, known as a dumb battery, which has no built-in MPU and is non-compliant with the SBS standards. The battery pack 600 only includes the cells 11, the thermistor 25, the impact sensor 27, a flash memory 629, and a flash memory writing mechanism 641. The current measurement circuit 13, the voltage measurement circuit 15, the discharging FET 17, and the charging FET 19 are included in the notebook PC 700 and are controlled by being connected to the embedded controller 121. The outputs from the thermistor 25 and the impact sensor 27 are connected to the embedded controller 121. The flash memory 629 is connected to the embedded controller 121 and reading/writing of data from/to the flash memory 629 are performed by the embedded controller 121. The internal state of the battery pack 600 and the charging/discharging control thereof are directly managed by the embedded controller 121.

The writing mechanism 641 is a circuit having a function of converting an analog output from the impact sensor 27 into a digital value when the battery pack 600 has been subjected to an external impact, and a function of writing a peak value of the impact in the flash memory 629. The flash memory 629 also stores therein, in addition to the peak value of the impact, information including the full charge capacity P2, the number of allowable charging times K, the allowable charge capacity P1, a threshold value for generating the impact information from the peak value of the impact, and the charging prohibition information. Operations performed by the MPU 21 and the embedded controller 121 of FIG. 2 in order to execute the procedures shown in FIGS. 5 to 7 are solely performed by the embedded controller 121 when the battery pack 600 is attached to the notebook PC 700.

Figure 9:
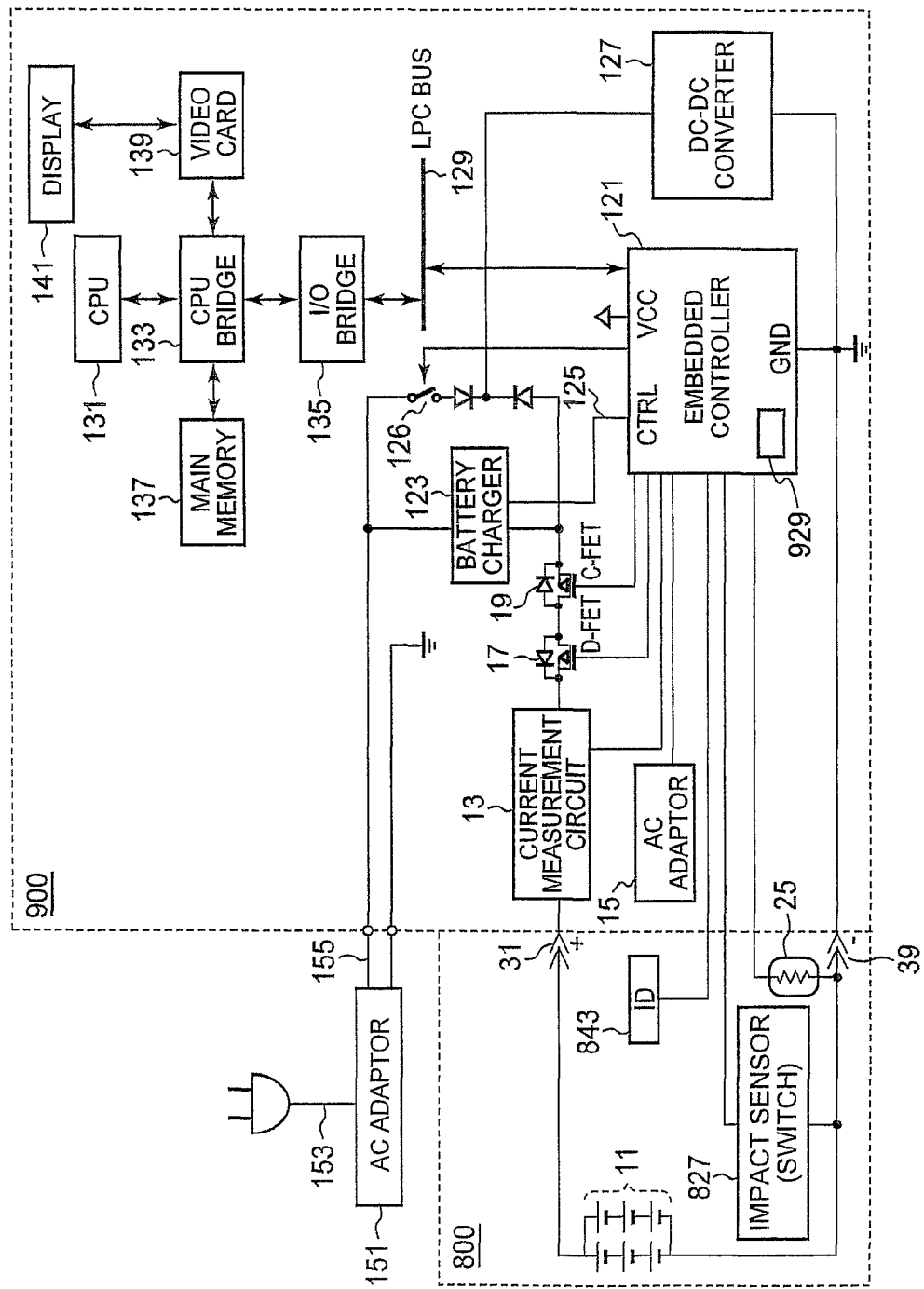
FIG. 9 is a block diagram of a battery pack and a notebook PC, in accordance with a third embodiment of the present invention.

FIG. 9 is a block diagram of a battery pack 800 and a notebook PC 900, in accordance with a third embodiment of the present invention. In FIG. 9, the same components as FIG. 8 will be referenced by the same reference numerals, and thus redundant description thereof will be omitted. Accordingly, only the difference will be described here. The battery pack 800 is a non-intelligent battery which has no built-in processor and is non-compliant with the SBS standards. The battery pack 800 only includes the cells 11, the thermistor 25, an impact sensor 827, and an ID 843. A flash memory 929 that records therein the charging state of the battery pack 800 is connected to the embedded controller 121 within the notebook PC 900.

The impact sensor 827 is not an acceleration sensor but uses a mechanism that switches on when an impact greater than a predetermined magnitude is applied once and that thereafter holds the state. Since this mechanism does not require a power supply, even when the battery pack 800 is removed from the notebook PC 900, the impact sensor 827 switches on upon application of an impact greater than a predetermined magnitude. When the impact sensor 827 switches on in a state where the battery pack 800 is connected to the notebook PC 900, or when the battery pack 800 is connected to the notebook PC 900 in a state where the impact sensor 827 is switched on, the embedded controller 121 recognizes the state as impact information and performs necessary processing. Operations performed by the MPU 21 and the embedded controller 121 of FIG. 2 in order to execute the procedures shown in FIGS. 5 to 7 are solely performed by the embedded controller 121 when the battery pack 800 is attached to the notebook PC 900.

The battery pack 800 stores therein ID 843 such as a production number that enables identifying individual products. The stored ID 843 is read out by the embedded controller 121. The embedded controller 121 stores in the internal flash memory 929 data according to the present invention such as the number of charging times of the battery pack and the number of impact times. Therefore, even when the battery pack 800 is replaced, it is possible to know whether or not a newly replaced battery pack has been subjected to an impact, and if it has been subjected to an impact, it is possible to know the number of remaining chargeable times. With such a construction, it is possible to simplify the construction of the battery pack 800 compared with the battery pack 600.

As has been described, the present invention provides a method for ensuring safe use of a battery pack after an impact had occurred on the battery pack.

While the invention has been particularly shown and described with reference to a preferred embodiment, it will be understood by those skilled in the art that various changes in form and detail may be made therein without departing from the spirit and scope of the invention.

What is claimed is:

1. A battery pack comprising:
    a battery;
    an impact sensor capable of generating an impact signal in response to a detection of an impact on said battery pack;
    a processor capable of generating impact information based on said impact signal, wherein said processor continues to count a number of charging times to said battery after said impact information has been generated; and
    a memory capable of storing said impact information and said number of charging times, wherein said memory is referred by said processor to deliver a control command to a battery charger so that said battery is charged up to an allowable charge capacity smaller than a full charge capacity after an occurrence of an impact when said battery pack is attached to said battery charger, and said battery is prohibited to be charged when said number of said counted charging times reaches a predetermined number of allowable charging times that is allowed after the generation of said impact information.

2. The battery pack of claim 1, wherein said impact information is generated when said impact signal exceeds a first threshold value once.

3. The battery pack of claim 1, wherein said impact information is generated when said impact signal exceeds a second threshold value lower than a first threshold value a predetermined number of times.

4. The battery pack of claim 1, wherein said allowable charge capacity is approximately within the range of 30 to 50 percent of a rated capacity of said battery.

5. The battery pack of claim 1, wherein said allowable charge capacity is a product of a predetermined reduction ratio and said full charge capacity of said battery upon an occurrence of an impact.

6. The battery pack of claim 1, wherein said battery pack further includes a charging field-effect transistor (FET), wherein when said number of said counted charging times reaches said allowable charging times, said processor maintains said charging FET at an off state to prohibit a charging of said battery.

7. The battery pack of claim 1, wherein said processor transitions to a normal mode to generate said impact information upon a receipt of an impact signal from said impact sensor when said processor is a sleep mode.

8. An apparatus comprising:
a system load;
a battery bay for removably accommodating therein a battery pack, wherein said battery bay includes
a battery;
a battery charger for charging said battery;
a controller for controlling said battery charger; and
an external power supply terminal for connecting an AC adapter which supplies electric power to the system load and said battery charger, wherein said battery pack comprises:
an impact sensor capable of detecting an impact to thereby output an impact signal,
a processor capable of generating impact information based on the impact signal, and further counting the number of charging times to the secondary battery after the impact information has been generated; and
a memory capable of storing said impact information and said number of charging times, wherein said memory is referred by said processor to deliver a control command to a battery charger so that said battery is charged up to an allowable charge capacity smaller than a full charge capacity after an occurrence of an impact when said battery pack is attached to said battery charger, and said battery is prohibited to be charged when said number of said counted charging times reaches a predetermined number of allowable charging times that is allowed after the generation of said impact information.

9. The apparatus of claim 8, wherein said apparatus further includes a switch that is connected between said external power supply and said system load, wherein when said controller recognizes said impact information when said battery pack is attached to said battery bay and an AC adaptor is connected to said external power supply terminal, said controller turns off said switch until a remaining capacity of said secondary battery is lowered equal to or below said allowable charge capacity.

10. The apparatus of claim 8, wherein said apparatus further includes a display, wherein when said controller recognizes said impact information, said controller displays a message on said display for prompting the replacement of said battery.

11. A method for controlling charging of a battery in a system having a battery pack for accommodating said battery, said method comprising:
detecting an impact to said battery pack to generate impact information;
offering a number of allowable charging times that is allowed after said impact information has been generated and an allowable charge capacity smaller than a full charge capacity upon occurrence of an impact;
counting a number of charging times to said battery after the generation of said impact information; and
charging said battery up to said allowable charge capacity until said number of charging times reaches said number of allowable charging times, while prohibiting said charging to said battery when said number of charging times reaches said number of allowable charging times after said impact information has been generated.

* * * * *